July 25, 1950 — M. M. ROOSSINOV — 2,516,724
WIDE ANGLE ORTHOSCOPIC ANASTIGMATIC PHOTOGRAPHIC OBJECTIVE
Filed Aug. 23, 1946 — 2 Sheets-Sheet 1
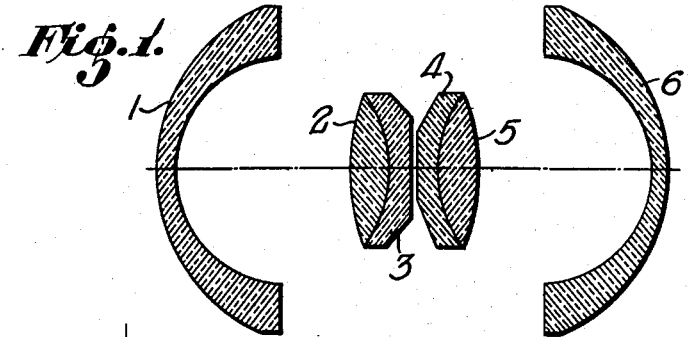
Fig. 1.
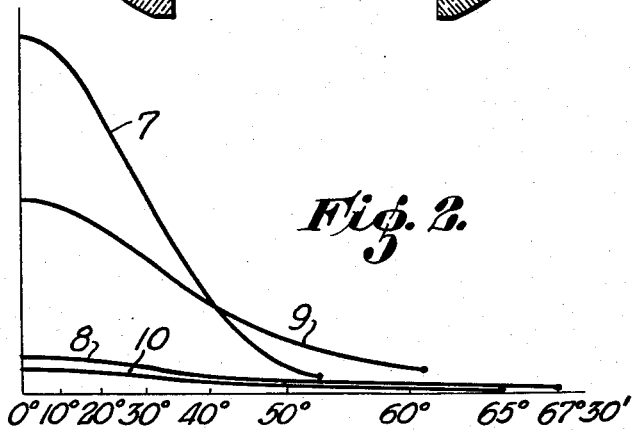
Fig. 2.
Fig. 3.  Fig. 4.  Fig. 5.  Fig. 6.  Fig. 7. 
Fig. 8. 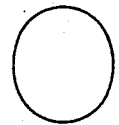 Fig. 9. 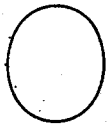 Fig. 10. 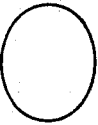 Fig. 11.  Fig. 12. 
INVENTOR:
M. M. ROOSSINOV,
BY Glascock, Downing & Seebold
ATTORNEYS July 25, 1950
M. M. ROOSSINOV
WIDE ANGLE ORTHOSCOPIC ANASTIGMATIC
PHOTOGRAPHIC OBJECTIVE
2,516,724
Filed Aug. 23, 1946
2 Sheets-Sheet 2
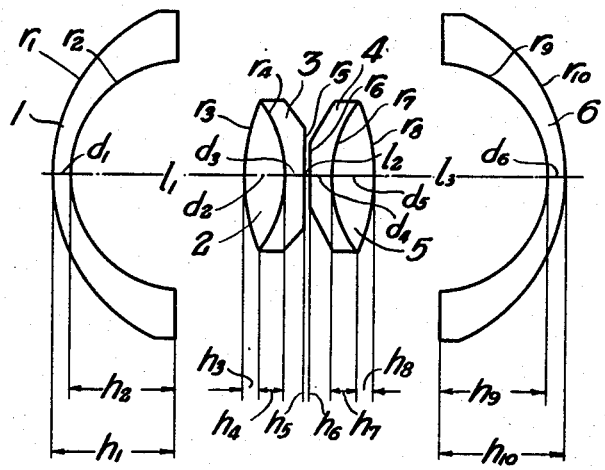
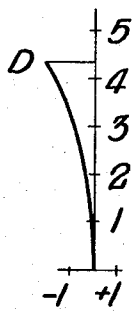
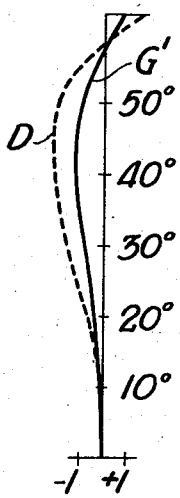
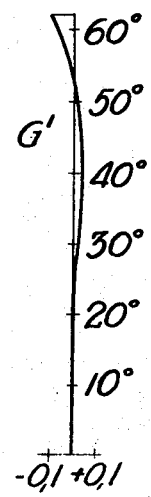
INVENTOR:
M. M. ROOSSINOV,
BY
ATTORNEYS Patented July 25, 1950

2,516,724

UNITED STATES PATENT OFFICE 2,516,724

WIDE ANGLE ORTHOSCOPIC ANASTIGMATIC PHOTOGRAPHIC OBJECTIVE

Michael Michaelovitch Roossinov, Leningrad, Union of Soviet Socialist Republics

Application August 23, 1946, Serial No. 692,477

7 Claims. (Cl. 88—57)

The present invention relates to wide angle orthoscopic anastigmatic objectives for aerial photography and other purposes especially their use for mapping and aerial surveying.

It is well known that an important feature of wide angle objectives is the fact that a sharp decrease in illumination of the image occurs progressively towards the margin of the image which limits the angle of view of the objective to approximately 95°–105°. In images produced with the usual types of wide angle objectives the illumination at the margins is approximately 5 per cent of the center illumination.

At present there exists an urgent necessity for increasing the field of view of objectives employed in aerial photographic work with the corresponding decrease in the scale of the photographs.

In 1934, in the U. S. S. R., a wide angle objective was produced—the Leear-6—its field of view extending 100°, and by 1936 the above mentioned photographic objective was replaced by the wide angle objective, the Russar-1, covering an angular field of 105° and of improved quality; both objectives were designed according to inventions of the author of the present patent application.

At that time, the Zeiss Company (Germany) brought out a wide angle photographic objective, the Topogon, constructed according to Merté's calculations, it being similar in type to the objective the Russar-1, the angular field covering 96°; later in the U. S. A. an objective, the Metrogon, was produced with an angular field of 92°. All of the above mentioned photographic objectives are relatively complicated constructions.

The simplest wide angle photographic objective, the Hypergon, designed by Hoegh, covers an angular field of 140° but it is not corrected for either chromatic or spherical aberration, the ratio of aperture is only 1:30.

Among other devices designed to increase the angular field for aerial photographic work are a number of multi-objective cameras made by Zeiss (Germany), the Ashenbrenner camera (Germany), the Drobyshev camera (U. S. S. R.), the Fairchild camera (U. S. A.). A number of these cameras were employed for regular aerial photographic work but with the advent of wide angle objectives they were completely superseded by them in the field of aerial photography and mapping due to the poor accuracy of multi-objective cameras, and also due to the complexity of developing perspective pictures and the necessity of their subsequent laying-out.

The diminution in the illustration of the image from the center towards the edges of the field of view in conventional objectives is in accord with Lambert's law—$\cos^4 \beta$ (the decrease is proportional to the fourth power of the cosine of one-half of the angle of view), but in reality it is even greater due to the phenomenon of "vignetting"—i. e. due to the sharp decrease of the area of the entrance aperture of the objective towards the edge of the image, this is an essential drawback of the existing objectives.

Thus, in all modern objectives the decrease in illumination according to Lambert's law causes the illumination on the edge of the field of view to be but 15–20 per cent of the illumination in the center, and the decrease in the illumination attributed to vignetting causes the illumination on the edge of the field to be but 30–35 per cent of the illumination in the center; this reduces the total illumination on the edge of the field, as was stated previously, to about only 5 per cent of the illumination in the center of the field.

The urgent necessity for increasing the illumination at the edge of the field of view brought about the use of the following arrangements: (1) A star shaped rotating diaphragm built into the objective, serving the purpose of increasing the exposure on the edge of the field of view, and (2) The use of the Miethe compensator, however, these devices were not sufficiently satisfactory.

In a wide-angle objective embodying the present invention the decrease in the illumination follows the law of $\cos^3 \beta$ and this makes possible the widening of the angle of view up to 120° and more.

The outstanding feature of the present invention is an arrangement of a super-wide-angle objective in which the phenomenon of aberrational vignetting is utilized in such a manner that it increases the area of the entrance aperture towards the edge of the field approximately by a factor of two; thus making possible a broadening of the angle of view up to 120° or more, with the resulting illumination on the edge of the field approximately equalling 10–12% of the illumination in the center of the field; thus, the illumination of the edge of the field is twice that obtained with conventional wide-angle objectives the angle of view of which covers about 100°.

Referring to the figures of the accompanying drawings:

Fig. 1 is a sectional view showing the form and arrangement of the lenses of the present invention.

Fig. 2 is a group of curves showing the relative distribution of light in various types of photographic objectives as a function of the angles of view.

Figs. 3–7 depict the vignetting, i. e. the change of the area of the cross-section of light beams entering the objective for conventional wide-angle objectives for various sections of the field of view in angular measurement.

Figs. 8–12 depict the aberrational vignetting—the change of the area of the cross-section of beams entering the objective for an objective embodying the present invention for the corresponding sections of the field of view in angular degrees.

Fig. 13 is a sectional view of an objective embodying the present invention depicting the notation employed in the numerical Examples I and II.

Fig. 14 is a diagram of the spherical and chromatical correction curve in an objective embodying the present invention.

Fig. 15 is a diagram of curves illustrating the correction for astigmatism in an objective embodying the present invention.

Fig. 16 is a diagram of curve illustrating the correction for distortion in an objective embodying the present invention.

A design embodying the present wide-angle objective consists of two, more or less symmetrical halves (see Fig. 1) one of which includes the lenses 1, 2 and 3, and the other 4, 5 and 6; each half consists of two systems of lenses—one negative and one positive; the exterior lenses being negative 1 and 6, and the medial lenses being positive 2, 3 and 4, 5.

The entire system of lenses has a common axis of symmetry; and each of the negative lenses is separated from the positive lens by the air gap.

Both exterior negative lenses 1 and 6 have the form of greatly curved meniscus, the inner surfaces of which are slightly less or greater than a semisphere, i. e. with the inner semispherical surface the radial angle being 170° and 190°.

Each of the medial member positive lenses consists of two cemented lenses 2, 3 and 4, 5; they should have a surface of cementation proper for correction of aberration of incident beams, and their convex surfaces should face the diaphragm, and the index of refraction with the concave side of the cemented lens should be greater than that of the convex side. In order to correct for distortion and zonal aberration the medial positive lenses should be thick (i. e. have a thickness of about 20% of the focal length); the surfaces of these lenses facing the diaphragm are either plane or slightly concave.

The form of the greatly curved meniscus with its inner surface approximately equal to a half-sphere of the exterior lens 1 is of great importance, because due to this fact aberrational vignetting is achieved, which increases the area of the entrance aperture of the objective towards the edge of the field of view, and this phenomenon is achieved by maximum divergence from Abbe's conditions of sines for the front half of the objective for an object located in the plane of the diaphragm.

Between the two halves of the objective a light filter may be inserted if properly accounted for when calculating the objective. The types of glass of all the member lenses of the objective are chosen in pairs having equal refractive indices but the dispersion of which are different in order to achieve correction for chromatic distortion and chromatic astigmatism, i. e. the glass of the exterior lenses should differ: the lens 6 should have an Abbe number less than the Abbe number for lens 1.

In an objective embodying the present invention, as was mentioned above, the decrease in illumination towards the edge of the field occurs more gradually, less intensively, and the resolving power of the objective is greater than in conventional designs, i. e. the illumination towards the edge of the field of view in objectives embodying the present invention is in effect quite sufficient to achieve high quality photographs.

In order to explain the above statement Fig. 2 shows a diagram of curves of relative distribution of light for several photographic objectives. The abscissa represents the half-angle of view in angular degrees, and the ordinate—the relative illumination. Curve 7 represents a type of photographic objective now in common use, for example, the Topogon. Curve 8 represents an objective embodying the present invention—the wide-angle objective, the Russar-21. Curve 9 represents a modification embodying the present invention—the Russar-22, and, finally, curve 10 represents objectives of the Hypergon type.

Fig. 2 plainly shows the different character of the curves. Curve 7 sharply falls off towards the edge of the field of view illustrating the intense decrease in illumination for objectives of this type the angle of view of which is limited to about 100°–105°, whereas the curves 8 and 9 illustrate a more evenly distributed illumination, although somewhat less in the center of the field in comparison with conventional objectives, but greater towards the edge of the field of view and therefor encompassing a wider angle of view extending 120° and more.

As was stated above the decrease in illumination in objects embodying the present invention follows the law $\cos^3 \beta$ due to aberrational vignetting which is utilized in such a manner that the area of oblique beams entering the objective almost does not differ from the area of the axial beams.

In order to understand this effect better Figures 3–7 depict the vignetting occurring in conventional wide-angle objectives, i. e. the decrease in the area of the cross-section of the beams entering the objective for various sections of the field of view in angular measurement, beginning with the section, the half angle of the field of view for which equals 30° (Fig. 3), then 40° (Fig. 4), 45° (Fig. 5), 50° (Fig. 6) and 55° (Fig. 7).

Figures 8–12 illustrate aberrational vignetting in an objective embodying the present invention also for various sections of the field of view corresponding to the same sections of Figs. 3–7 in angular degrees from 30° (Fig. 8), 40° (Fig. 9), 45° (Fig. 10), 50° (Fig. 11) and 55° (Fig. 12).

On examining Figures 3–12 it becomes evident that a change in the area of beams practically doesn't exist for objectives embodying the present invention (see Figs. 8–12), i. e. the area of the cross-section of the beam remains almost invariable for various sections of the field of view, approximately equalling the area of the beam near the center of the field; while in conventional objectives the area of the cross-section of beams, being smaller when only slightly off center, quickly decreases as the distance from the center increases becoming towards the edge of the field, a narrow strip.

Thus, the phenomenon aberrational vignetting, utilized properly, serves as an advantage as in objectives embodying the present invention, while the same phenomenon in conventional objectives is inherently a disadvantage.

To effect a more complete correction of distortion and coma in order to accomplish higher quality both halves of the objective are not exactly symmetrical.

In order to clarify this point and also to illustrate a design of an objective embodying the present invention two numerical examples are given below:

Fig. 13 represents a sectional view of the member lenses of the objective with the letter notation of the various characteristics of the objective for illustrative Examples I and II.

All dimensions below are in inches and in the brackets are the dimensions in millimeters.

The symbols $r_1$ to $r_{10}$ denote the radii of the refracting surfaces, $d_1$ to $d_6$ denote the thicknesses of the lens elements, $l_1$ to $l_3$ denote the axial separations of the lens elements, and $h_1$ to $h_{10}$ denote the sagittal distances.

Example I

| Radii | | Thickness and air gaps | | Sagittas | | Types of glass |
|---|---|---|---|---|---|---|
| $r_1$ | 1.38683 (35.218) | $d_1$ | 0.07520 (1.91) | $h_1$ | 0.85236 (21.65) | ЛI-67 |
| $r_2$ | 0.77165 (19.60) | | | $h_2$ | 0.81102 (20.60) | |
| | | $l_1$ | 1.23779 (31.44) | | | |
| $r_3$ | 1.66141 (42.20) | | | $h_3$ | 0.04724 (1.20) | ЛI-24 |
| | | $d_2$ | 0.32165 (8.17) | | | |
| $r_4$ | −0.85708 (−21.77) | | | $h_4$ | 0.09567 (2.43) | |
| | | $d_3$ | 0.10709 (2.72) | | | |
| $r_5$ | 6.32361 (160.62) | | | $h_5$ | 0.00315 (0.08) | ЛI-28 |
| | | $l_2$ | 0.07362 (0.441) | | | |
| $r_6$ | −6.32361 (−160.62) | | | $h_6$ | 0.00063 (0.016) | ЛI-28 |
| | | $d_4$ | 0.10709 (2.72) | | | |
| $r_7$ | 0.85708 (21.77) | | | $h_7$ | 0.09567 (2.43) | |
| | | $d_5$ | 0.32165 (8.17) | | | ЛI-24 |
| $r_8$ | −1.66141 (−42.20) | | | $h_8$ | 0.04724 (1.20) | |
| | | $l_3$ | 1.23779 (31.44) | | | |
| $r_9$ | −0.77165 (−19.60) | | | $h_9$ | 0.81102 (20.60) | |
| | | $d_6$ | 0.07520 (1.91) | | | ЛI-15 |
| $r_{10}$ | −1.40008 (−35.562) | | | $h_{10}$ | 0.83173 (21.126) | |

Free diameter of the lens 1—2.48031 (63)
Free diameter of the lens 2—0.70866 (18)
Free diameter of the lens 3—0.39370 (10)
Free diameter of the lens 4—0.17717 (4.5)
Free diameter of the lens 5—0.70866 (18)
Free diameter of the lens 6—2.48031 (63)
Full diameter of the lens 1—2.55905 (65)
Full diameter of the lens 2–5—0.78740 (20)
Full diameter of the lens 6—2.55905 (65)
Sags $h_1$, $h_3$, $h_4$, $h_7$, $h_8$, $h_{10}$ are calculated from the full diameter.
Sags $h_2$, $h_5$, $h_6$, $h_9$ are calculated from the free diameter.
Radii $r_5$ and $r_6$ are of concave curvature.

In case an inter-lens diaphragm is desired the two cemented lenses have like configuration (of one cemented lens)—the diaphragm being placed in the center and having an aperture equalling 0.17717 inch (4.5 mm.). The aperture of the diaphragm is achieved by interception of two surfaces at an angle of 45°.

The tolerance for thickness:

$$\Delta d = \pm 0.0003937 \; (0.01)$$

The focal length:

$$F_1 = 2.33858 \; (59.4)$$
$$p^1 = 1.23590 \; (31.9)$$

The total angle of view: $2\beta = 133°$
Aperture ratio: 1:18

Example II

| Radii | | Thickness and air gaps | | Sagittas | | Types of glass |
|---|---|---|---|---|---|---|
| $r_1$ | 1.39251 (35.370) | $d_1$ | 0.08465 (2.15) | $h_1$ | 0.94567 (24.02) | ЛI-67 |
| $r_2$ | 0.89331 (22.690) | | | $h_2$ | 0.93268 (23.69) | |
| | | $l_1$ | 1.40078 (35.58) | | | |
| $r_3$ | 1.87263 (47.565) | | | $h_3$ | 0.09567 (2.43) | ЛI-24 |
| | | $d_2$ | 0.36220 (9.20) | | | |
| $r_4$ | −0.96614 (−24.540) | | | $h_4$ | 0.20157 (5.12) | |
| | | $d_3$ | 0.12087 (3.07) | | | |
| $r_5$ | 5.19361 (131.918) | | | $h_5$ | 0.01496 (0.38) | ЛI-28 |
| | | $l_2$ | 0.01941 (0.493) | | | |
| $r_6$ | −5.09999 (−129.540) | | | $h_6$ | 0.00709 (0.18) | ЛI-28 |
| | | $d_4$ | 0.11890 (3.029) | | | |
| $r_7$ | 0.94882 (24.100) | | | $h_7$ | 0.20630 (5.24) | |
| | | $d_5$ | 0.35590 (9.04) | | | ЛI-24 |
| $r_8$ | −1.83858 (−46.700) | | | $h_8$ | 0.09724 (2.47) | |
| | | $l_3$ | 1.37559 (34.94) | | | |
| $r_9$ | −0.87677 (−22.270) | | | $h_9$ | 0.91614 (23.27) | |
| | | $d_6$ | 0.08307 (2.11) | | | ЛI-3 |
| $r_{10}$ | −1.30023 (−34.550) | | | $h_{10}$ | 0.95748 (24.32) | |

Free diameter of the lens 1—2.59842 (66)
Free diameter of the lens 2—1.10236 (28)
Free diameter of the lens 3—0.7874 (20)
Free diameter of the lens 4—0.43307 (11)
Free diameter of the lens 5—1.10236 (28)
Free diameter of the lens 6—2.55905 (65)
Full diameter of the lens 1—2.63779 (67)
Full diameter of the lens 2–5—1.18110 (30)
Full diameter of the lens 6—2.59842 (66)
Sags: $h_1$, $h_3$, $h_4$, $h_7$, $h_8$, $h_{10}$ are calculated from the full diameter.
Sags: $h_2$, $h_5$, $h_6$, $h_9$ are calculated from the free diameter.
The tolerance for thickness: $d = \pm 0.0003937 \; (0.01)$
The focal length:

$$F = 2.75118 \; (69.88)$$
$$p_1 = 1.38858 \; (35.27)$$
$$p = 1.45236 \; (36.89)$$

The total angle of view: $2 = 122°$
Aperture ratio: 1:8

The kinds of glass are chosen from the catalogue of the Lenzos Co. 1936 and have the following main characteristics:

| Type of glass | Coefficient of refraction | Abbe number |
|---|---|---|
| JI-3 (L-3) | 1.6242 | 35.9 |
| JI-15 (L-15) | 1.6259 | 39.1 |
| JI-24 (L-24) | 1.6126 | 58.6 |
| JI-28 (L-28) | 1.5480 | 45.9 |
| JI-67 (L-67) | 1.6395 | 43.3 |

As can be seen from the above examples the symmetry of the two halves is not quite exact due to the difference in the radii of curvature, the size of the sagittas, the thickness of the lenses, the length of the air gaps and the types of glass.

Besides this a characteristic feature of objectives embodying the present invention, as may be seen from the above examples, is the fact that the total length of the objective (that is the sum total of the axial dimensions of the member lenses) is greater than the focal length of the objective.

Objectives embodying the present invention were not only thoroughly investigated experimentally, but have been manufactured and are presently being employed with great success.

The above examples are given only as illustrations and are not to be considered as limiting the present invention of a wide-angle objective in any manner whatsoever.

Since details of a wide-angle orthoscopic anastigmatic photographic objective may be modified, the scope of the invention is defined by the claims as hereunto appended.

I claim:

1. A wide angle orthoscopic anastigmatic objective for aerial photography and other purposes having a wide field of view and comprising two substantially symmetrical groups of lenses each group consisting of a medial cemented positive member and an exterior negative member, the negative members of both groups being shaped to form considerably concave menisci bent in the direction of the diaphragm, the entire system of lenses having a common horizontal axis of symmetry and each negative lens being separated from the nearest positive lens by an air gap, the convex surfaces of cementation of the positive medial members face the diaphragm, and the coefficient of refraction of the concave surface of the cemented surfaces of the positive medial member lenses being greater than that of the convex surface.

2. A wide angle orthoscopic anastigmatic objective for aerial photography and other purposes having a wide field of view and comprising two substantially symmetrical groups of lenses each group consisting of a medial cemented positive member and an exterior negative member, the negative members of both groups being shaped to form considerably concave menisci bent in the direction of the diaphragm with an inner semispherical surface the radial angle being 170°–190°, and each of the negative member lenses being separated from the nearest positive member by an air gap, the convex surfaces of cementation of the positive medial members face the diaphragm, the coefficient of refraction of the concave surface of the cemented surfaces of the positive medial member lenses being greater than that of the convex surface, the said positive member lenses of both groups of the objective being united together and adjacent and almost touching with an air gap between them of from 0 to 3 per cent of the focal length of the objective, the surfaces facing the diaphragm have slightly concave or flat central sections, the entire system having a common horizontal axis of symmetry.

3. A wide angle orthoscopic anastigmatic objective for aerial photography and other purposes having a wide field of view and comprising two substantially symmetrical groups of lenses each group consisting of a medial cemented positive member and an exterior negative member, the negative members of both groups being shaped to form considerably concave menisci bent in the direction of the diaphragm with an inner semispherical surface the radial angle being 170°–190° and each of the negative member lenses being separated from the nearest positive member by an air gap, the convex surfaces of cementation of the positive medial members face the diaphragm, the coefficient of refraction of the concave surface of the cemented surfaces of the positive medial member lenses being greater than that of the convex surface, the said positive member lenses of both groups of the objective being united together and adjacent and almost touching with an air gap between them of from 0 to 3 per cent of the focal length of the objective, the surfaces facing the diaphragm have slightly concave or flat central sections, the entire system having a common horizontal axis of symmetry, the said objective having good correction for astigmatism, distortion and chromatic distortion the positive members being made considerably thick, approximately 20 per cent the focal length of the objective and the back negative member lens of the objective facing the observer having an Abbe number less than the exterior member lens facing the object.

4. A wide angle orthoscopic anastigmatic objective for aerial photography and other purposes having a wide field of view and comprising two substantially symmetrical groups of lenses each group consisting of a medial cemented positive member and an exterior negative member, the negative members of both groups being shaped to form considerably concave menisci bent in the direction of the diaphragm with an inner, semispherical surface, the radial angle being 170°–190°, the back negative member lens facing the observer having an Abbe number less than the exterior negative member facing the object, both negative member lenses being separated from the nearest positive member by an air gap, the convex surfaces of cementation of the positive medial members face the diaphragm, the coefficient of refraction of the concave surface of the cemented surfaces of the positive medial member lenses being greater than that of the convex surface, the said positive member lenses of both groups of the objective being united together and are adjacent and almost touching with an air gap between them of from 0 to 3 per cent of the focal length of the objective, the surfaces facing the diaphragm having slightly concave or flat central sections, and the said positive members are made considerably thick, approximately 20 per cent the focal length of the objective, the front group of lenses of the objective having a maximum deviation from Abbe's condition of sines, the phenomenon of aberrational vignetting utilized in such a manner that correction is achieved in the entrance aperture of the objective resulting in a twofold increase in area of the entrance aperture of the objective on the edge of the field in respect to the area of the entrance aperture on the axis and a decrease of illumination of the image from the center of the field towards its edges taking place in accord with the law $\cos^3 \beta$, where $\beta$ is one-half of the angle of view.

5. A wide angle orthoscopic anastigmatic objective as claimed in claim 4 in which the length of the objective is greater than the focal length of the objective.

6. A wide angle orthoscopic anastigmatic objective having numerical data substantially as set forth in the following table:

Table

| Radii | | Thickness and axial separation | | Sagittas (sagittal distances) | | Abbe number of glass |
|---|---|---|---|---|---|---|
| $r_1$ | 1.38683 (35.218) | $d_1$ | 0.07520 (1.91) | $h_1$ | 0.85236 (21.65) | 43.3 |
| $r_2$ | 0.77165 (19.60) | $l_1$ | 1.23779 (31.44) | $h_2$ | 0.81102 (20.60) | |
| $r_3$ | 1.66141 (42.20) | $d_2$ | 0.32165 (8.17) | $h_3$ | 0.04724 (1.20) | 58.6 |
| $r_4$ | −0.85708 (−21.77) | $d_3$ | 0.10709 (2.72) | $h_4$ | −.09567 (2.43) | |
| $r_5$ | 6.32361 (160.62) | $l_2$ | 0.07362 (0.441) | $h_5$ | 0.00315 (0.08) | 45.9 |
| $r_6$ | −6.32361 (−160.62) | $d_4$ | 0.10709 (2.72) | $h_6$ | 0.00063 (0.016) | 45.9 |
| $r_7$ | 0.85708 (21.77) | $d_5$ | 0.32165 (8.17) | $h_7$ | 0.09567 (2.43) | 58.6 |
| $r_8$ | −1.66141 (−42.20) | $l_3$ | 1.23779 (31.44) | $h_8$ | 0.04724 (1.20) | |
| $r_9$ | −0.77165 (−19.60) | $d_6$ | 0.07520 (1.91) | $h_9$ | 0.81102 (20.60) | 39.1 |
| $r_{10}$ | −1.40008 (−35.562) | | | $h_{10}$ | 0.83173 (21.126) | |

Wherein (r-1) to (r-10) denote the radii of the refracting surfaces. (d-1) to (d-6) denote the thicknesses of the lens elements. (l-1) to (l-3) denote the axial separation of the lenses. (h-1) to (h-10) denote the sagittal distances.

7. A wide angle orthoscopic anastigmatic objective having numerical data substantially as set forth in the following table:

Table

| Radii | | Thickness and axial separation | | Sagittas (sagittal distances) | | Abbe number of glass |
|---|---|---|---|---|---|---|
| $r_1$ | 1.39251 (35.370) | $d_1$ | 0.08465 (2.15) | $h_1$ | 0.94567 (24.02) | 43.3 |
| $r_2$ | 0.89331 (22.690) | $l_1$ | 1.40078 (35.58) | $h_2$ | 0.93268 (23.69) | |
| $r_3$ | 1.87263 (47.565) | $d_2$ | 0.36220 (9.20) | $h_3$ | 0.09567 (2.43) | 58.6 |
| $r_4$ | −0.96614 (−24.540) | $d_3$ | 0.12087 (3.07) | $h_4$ | 0.20157 (5.12) | |
| $r_5$ | 5.19361 (131.918) | $l_2$ | 0.01941 (0.493) | $h_5$ | 0.01496 (0.38) | 45.9 |
| $r_6$ | −5.09999 (−129.540) | $d_4$ | 0.11890 (3.029) | $h_6$ | 0.00709 (0.18) | 45.9 |
| $r_7$ | 0.94882 (24.100) | $d_5$ | 0.35590 (9.04) | $h_7$ | 0.20630 (5.24) | 58.6 |
| $r_8$ | −1.83858 (−46.700) | $l_3$ | 1.37559 (34.94) | $h_8$ | 0.09724 (2.47) | |
| $r_9$ | −0.87677 (−22.270) | $d_6$ | 0.08307 (2.11) | $h_9$ | 0.91614 (23.27) | 35.9 |
| $r_{10}$ | −1.36023 (−34.550) | | | $h_{10}$ | 0.95748 (24.32) | |

Wherein (r-1) to (r-10) denote the radii of the refracting surfaces. (d-1) to (d-6) denote the thicknesses of the lens elements. (l-1) to (l-3) denote the axial separation of the lenses. (h-1) to (h-10) denote the sagittal distances.

ROOSSINOV, MICHAEL MICHAELOVITCH.

REFERENCES CITED

The following references are of record in the file of this patent:

UNITED STATES PATENTS

| Number | Name | Date |
|---|---|---|
| 2,031,792 | Richter | Feb. 25, 1936 |
| 2,140,024 | Merte | Dec. 13, 1938 |
| 2,146,662 | Van Albada | Feb. 7, 1939 |

FOREIGN PATENTS

| Number | Country | Date |
|---|---|---|
| 21,211 | Great Britain | of 1901 |
| 225,398 | Great Britain | Dec. 4, 1924 |
| 620,538 | Germany | Oct. 23, 1935 |
| 329,350 | Great Britain | May 16, 1938 |
| 677,592 | Germany | June 29, 1939 |